(12) United States Patent
Van Blokland

(10) Patent No.: US 11,716,997 B2
(45) Date of Patent: Aug. 8, 2023

(54) SYSTEM FOR PROVIDING A DOUGH SHEET OF A DOUBLE PRE-FERMENTED DOUGH

(71) Applicant: Radie B.V., BC Culemborg (NL)

(72) Inventor: Johannes Josephus Antonius Van Blokland, BG Laren (NL)

(73) Assignee: Radie B.V., BC Culemborg (NL)

( * ) Notice: Subject to any disclaimer, the term of this patent is extended or adjusted under 35 U.S.C. 154(b) by 1157 days.

(21) Appl. No.: 16/377,759

(22) Filed: Apr. 8, 2019

(65) Prior Publication Data

US 2019/0307134 A1    Oct. 10, 2019

(30) Foreign Application Priority Data

Apr. 9, 2018 (EP) ..................... 18166406

(51) Int. Cl.
*A21C 13/02* (2006.01)
*A21C 1/00* (2006.01)
*A21C 3/02* (2006.01)
*A21C 5/00* (2006.01)
*A21C 11/10* (2006.01)
*A21C 13/00* (2006.01)

(52) U.S. Cl.
CPC .............. *A21C 13/02* (2013.01); *A21C 1/003* (2013.01); *A21C 3/02* (2013.01); *A21C 5/00* (2013.01); *A21C 11/10* (2013.01); *A21C 13/00* (2013.01)

(58) Field of Classification Search
CPC ............ A21C 13/00; A21C 13/02; A21C 9/08
See application file for complete search history.

(56) References Cited

U.S. PATENT DOCUMENTS 4,046,920 A * 9/1977 Moline ............... A21C 3/02
426/19
4,204,466 A 5/1980 Schnee
(Continued)

FOREIGN PATENT DOCUMENTS

DE   37 1 2 372 A1   10/1987
WO   03/070005 A1   8/2003

OTHER PUBLICATIONS

Extended European Search Report for European Patent Application No. 18166406.1 dated Jul. 26, 2018.

*Primary Examiner* — Alison L Hindenlang
*Assistant Examiner* — Alexander A Wang
(74) *Attorney, Agent, or Firm* — The Dobrusin Law Firm, PC

(57) ABSTRACT

The present invention relates to a system for providing a dough sheet, comprising a mixer for mixing ingredients to a dough, a portioning device for portioning the dough in batches into carriers, a first fermenting stage, formed by a cabinet, the cabinet comprising a conveyor, configured for conveying the carriers along a trajectory through the cabinet, a first handler for placing the carriers in a fermenting cabinet, a second fermenting stage, formed by a conveyor, a second handler, for picking the carriers from the cabinet and placing the dough batches from the carriers onto the fermenting conveyor, wherein the second handler is configured for placing the dough batches in a touching or overlapping manner and a dough sheeting stage, for receiving the dough from the second fermenting stage and forming a sheet from the dough.

22 Claims, 2 Drawing Sheets

(56) References Cited

U.S. PATENT DOCUMENTS

| | | | | |
|---|---|---|---|---|
| 5,824,349 A | * | 10/1998 | Muller | A21C 3/04 |
| | | | | 426/503 |
| 2004/0076725 A1 | | 4/2004 | Torahiko et al. | |
| 2006/0040032 A1 | | 2/2006 | Peitzmeier et al. | |
| 2011/0073100 A1 | * | 3/2011 | Roncadin | A21C 13/02 |
| | | | | 126/281 |
| 2012/0263815 A1 | | 10/2012 | Lazis et al. | |
| 2018/0235242 A1 | * | 8/2018 | Meier | A21C 7/005 |

* cited by examiner

SYSTEM FOR PROVIDING A DOUGH SHEET OF A DOUBLE PRE-FERMENTED DOUGH

The present invention relates to a system for providing a dough sheet of a double pre-fermented dough. That is, dough that has undergone a fermentation stage twice, before products are formed from the dough, final proofing before baking takes place and the products are baked.

BACKGROUND

Throughout this application, the word fermenting is used for the process of giving dough time to rise, without implying further limitations to the conditions under which the fermenting takes place. In the art, the term proofing is commonly used as well, sometimes with the intention to indicate specific temperature conditions, which may be cooling or heating. In particular, the term fermenting is used to indicate a rise process before baking. Where limitations to cooling or heating are intended, they are explicitly mentioned in this application. In particular the invention relates to a system, for providing such dough sheet fully automated.

For certain dough products, the dough needs to ferment during a long time, sometimes also multiple times, before it is formed into pieces and forms for baking. It is a common practice to store large amounts of several tens of kilograms to even more than four hundred kilograms of dough in baskets or mixing bowls, in which the dough level may be up to eighty centimeters high. The baskets are then stored on floor level or stacked in cabinets from which they are picked up after the dough has fermented the required time.

SUMMARY

These known methods have several disadvantages. An important one is that due to the weight of the dough itself, the fermenting takes place in a non-homogeneous way in the baskets. One goal of the fermentation process is that gas bubbles are formed in the dough mass. Due to the non-lineair pressure distribution within the basket, the bubbles that arise in the dough that is lower in the basket are smaller, which is undesired, since a homogeneous distribution of holes caused by these bubbles is desired in the end products.

It is a goal of the present invention to take away the above disadvantage, or at least to provide a useful alternative to the existing methods and systems in the art.

DETAILED DESCRIPTION

The invention thereto provides a system for providing a dough sheet, comprising a mixer for mixing ingredients to a dough, a portioning device for portioning the dough in batches into carriers, a first fermenting stage, formed by a cabinet, the cabinet comprising a conveyor, configured for conveying the carriers along a trajectory through the cabinet, a first handler for placing the carriers in a fermenting cabinet, a second fermenting stage, formed by a conveyor, a second handler, for picking the carriers from the cabinet and placing the dough batches from the carriers onto the fermenting conveyor, wherein the second handler is configured for placing the dough badges in a touching or overlapping manner and a dough sheeting stage, for receiving the dough from the second fermenting stage and forming a sheet from the dough.

The system according to the invention provides as a first advantage that it facilitates automation of a fermenting process that is characterized by cumbersome manual handling of large baskets in the art. By introducing carriers that are suitable to be handled by a cabinet configured for conveying the carriers along a trajectory, the handling of the large and difficult to handle baskets can be omitted.

For that purpose, the carriers are designed smaller than the baskets regularly are. Where the baskets are in general dimensioned for carrying 400 kilograms of dough, the carriers preferably each comprise a bottom with a circumferential wall, dimensioned for comprising between 5 and 25, preferably between 10 and 20, and more preferably between 13 and 17 kg dough.

These carriers are due to their weight easy to handle automatically, both in filling and placing them in the cabinet, as in being conveyed in the cabinet. A first benefit that results from these carriers is that, contrary to the bins according to the state of the art that are placed at fixed locations in a stationary cabinet, since their weight prohibits easy handling and transportation. Since the carriers according to the invention follow the same path, all the dough is subject to the same circumstances. Humidity and temperature may normally fluctuate in the height direction of a cabinet, so that in stationary cabinets, dough that is placed in the top of the cabinet undergoes a different fermentation than dough at the bottom of the cabinet. The invention thus leads to a more homogeneous dough that is delivered to the sheeting process.

In a preferred embodiment, the carriers have a height between 10 and 80 cm, and in particular between 20 and 40 cm. This relatively low height takes away the disadvantages that result from the high dough level in the bins, in particular the uneven distribution of the size of the gas filled holes that develop in the dough during fermentation. A smaller volume has the advantage of an equally distributed pressure throughout the carrier, which also leads to a homogeneous gas distribution and structure.

Preferably, the wall of the carrier is dimensioned such that the fermented dough stays within the space of the carrier during fermentation, so the plates that support the carriers in the cabinet remain clean. Optionally the carriers may comprise a lid.

In a preferred embodiment, the conveying system of the cabinet is operated in a first-in-first-out mode and configured for containing the carriers for a time period of 1 to 48 hours, and in particular between 24 and 48 hours. The first-in-first-out mode ensures that the dough in the various carriers follows the same trajectory through the cabinet, and is likely to have the same consistency when leaving the cabinet.

In a practical embodiment the conveying system of the cabinet comprises a so called paternoster cabinet. In this type of cabinet the carriers zig-zag through the cabinet, going upwards in a first stack and going downward in an adjacent stack. The cabinet may evidently comprise a larger number of stacks. The cabinet may comprise trays for carrying or supporting the carriers.

The second pre-fermenting stage may be configured for containing the dough for 0-2 hours. This time has appeared to allow the dough portions coming from the carriers to adhere to each other and to form a uniform dough stream of dough for further sheeting.

In a further embodiment, the system comprises a cutting section, for cutting the thus formed dough sheet into pieces for forming dough products.

A further aspect of the present invention relates to a system for providing dough pieces, which may for instance be a system as described above, configured for collecting rework dough generated during the forming of the dough sheet or during the cutting into pieces.

In dough processing systems that work according to the sheeting principle, it is important that the dough sheet has the same properties throughout its length. These properties include the thickness, weight per area unit and width of the sheet. The latter is often achieved by cutting the sides of a sheet that is obtained by the first reduction stages. During this cutting step, rework dough is generated, which would be wasted if it were not returned to the dough process at some point in the system. The same goes for rework dough that is generated at cutting steps further in the process, for instance when cutting out pieces from the dough sheet in order to form individual products.

For that reason, preferably, the system comprises a feedback conveyor, for returning the collected rework dough to the dough process. The feedback conveyor may be configured for delivering the rework dough to the second fermenting stage. Here, it may for instance be deposited on the conveyor before the dough from the carriers is put on the conveyor, in order to be incorporated with the dough originating from the carriers.

Alternatively, the feedback conveyor may be configured to deliver the dough to the dough sheeting stage. This choice may be advantageous when the dough line is used for different dough products alternatively, and the return path for the rework dough is to be as short as possible.

The system according to the invention may further comprise a return transporter for the carriers and/or lids thereof, and/or a cleaning station for the carriers.

BRIEF DESCRIPTION OF THE DRAWINGS

The invention will now be elucidated with reference to the following figures.

Herein:

FIG. 1 shows a system 1 according to the invention. The system 1 comprises a mixer 2 for mixing ingredients to a dough, a portioning device 3 for portioning the dough in batches into carriers 4, a first fermenting stage, formed by a cabinet 5, the cabinet comprising a conveyor configured for conveying the carriers along a trajectory 6 through the cabinet, a first handler 7 for placing the carriers in the fermenting cabinet 5, a second fermenting stage 7, formed by a conveyor 7, a second handler 8, for picking the carriers from the cabinet and placing the dough batches from the carriers 4 onto the fermenting conveyor 7, wherein the second handler 8 is configured for placing the dough batches in a touching or overlapping manner 9, and a dough sheeting stage 10, for receiving the dough from the second fermenting stage 7 and forming a sheet from the dough. The conveying system of the cabinet comprises a so called paternoster cabinet, that is, a cabinet wherein the carriers follow a trajectory going up in a first stack, going down in a second stack, then up again in a third stack and so on. The paternoster cabinet comprises trays 11 for carrying the carriers. The system further comprising a return transporter 21 for the carriers 4, which may further comprise a cleaning station 22 for the carriers. Additionally, an optional oiling station 24 for the carriers is shown, arranged upstream from the portioning device 3.

FIG. 2 shows a second aspect of the invention, wherein the system 12 is configured for collecting rework dough generated during the forming 13 of the dough sheet or during the cutting 14 of the dough sheet into pieces. It is emphasized here that there may be several steps in between the forming of the dough sheet and the cutting into pieces for forming final products. The system comprises a feedback conveyor 15, for returning the collected rework dough to the dough process. The feedback conveyor may be configured for returning the rework dough to a second fermenting stage 23, which is in the example given a conveyor on which dough from carriers in which it has fermented in a first fermenting stage is deposited in order to form a single dough string. Alternatively, the rework dough may be returned to the start of the dough sheet forming stage 13, in order to be formed to a dough sheet. The system may comprise a switch 17, with which a choice can be made between returning the dough to the second fermenting stage 23 or via conveyor 16 to the dough sheeting stage 13. It may be preferred in general to return the dough to the second fermenting stage 23, but when a change of dough product is foreseen, it may be desired to shorten the return path of the dough to avoid a large amount of rework dough remaining when the production of the new product is started. Alternatively or additionally, in an embodiment the system may comprise a switch 18, with which the rework dough may be directed to the dough mixing stage 20. The system further comprises a second switch 25 for bypassing the first and/or second fermenting stage and for delivering green dough, that is unfermented dough from the mixer 2, to the dough sheeting stage 10.

Figure 1:
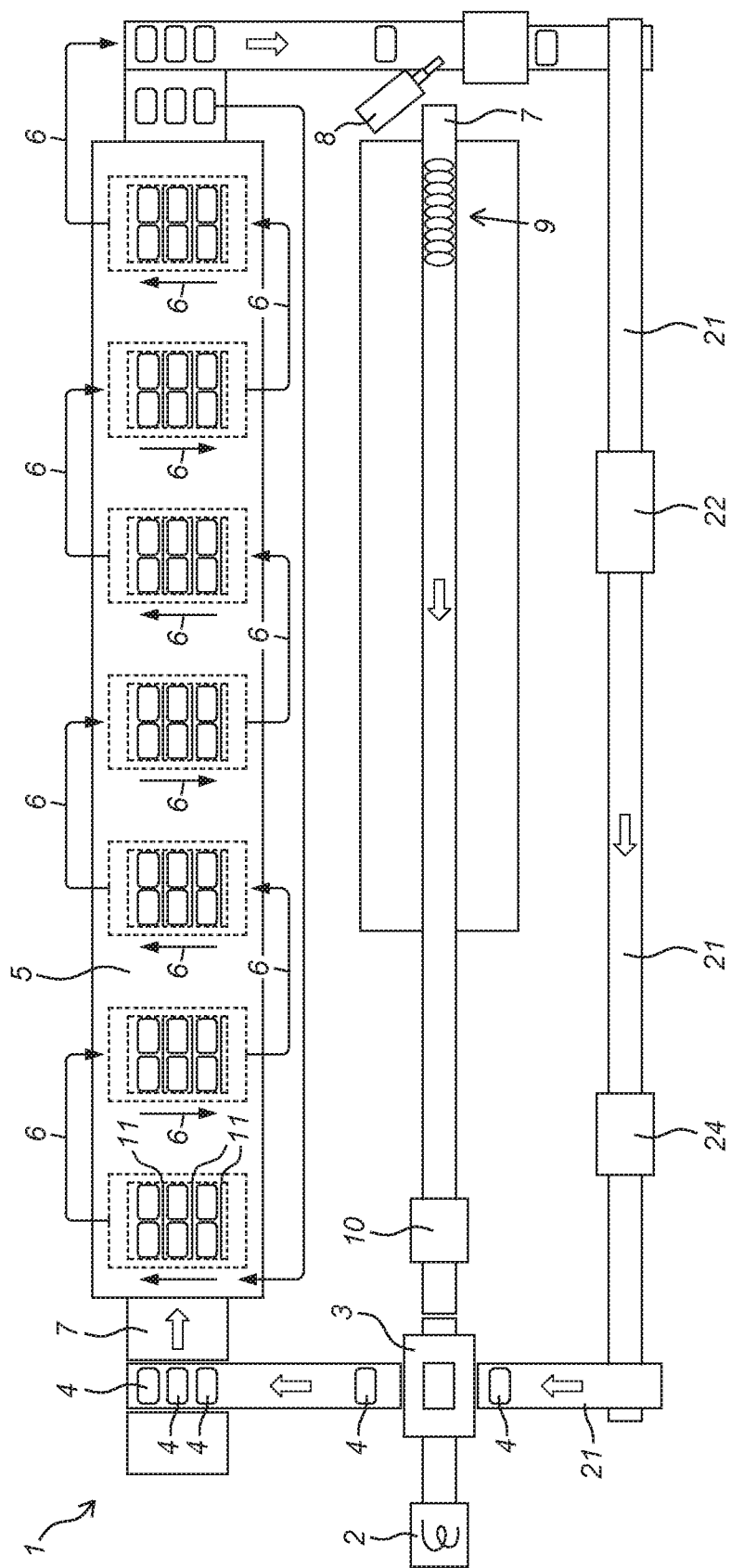
FIG. 1 shows a schematic view of a system according to the invention.
Figure 2:
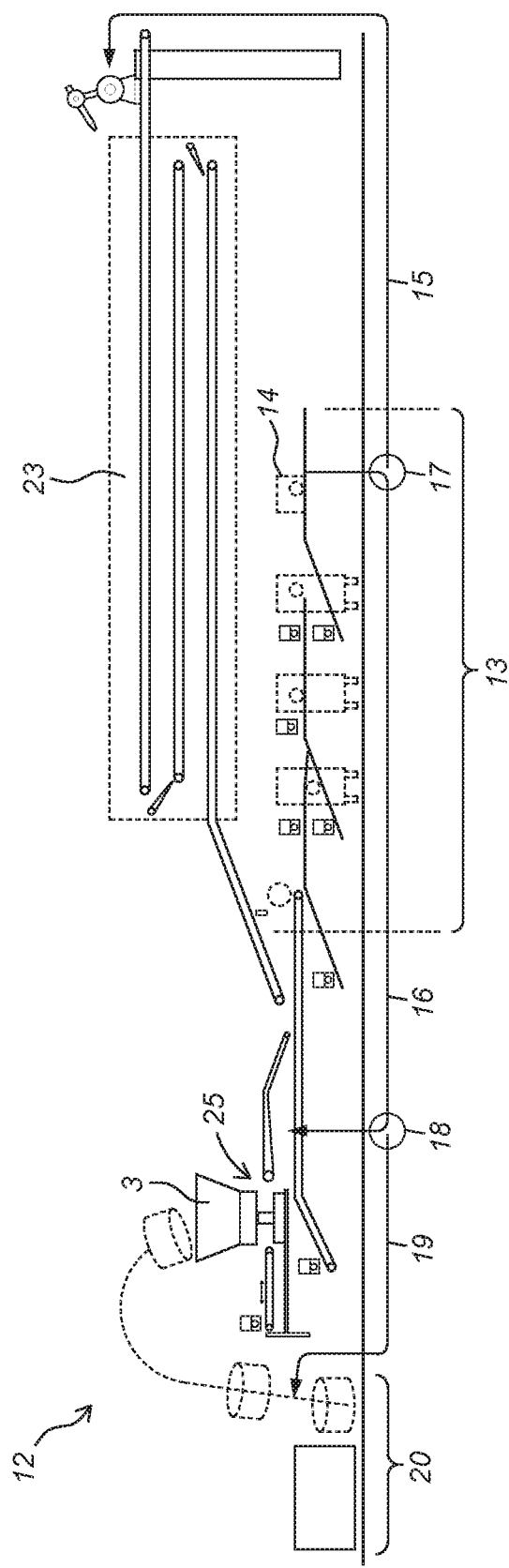
FIG. 2 shows a second aspect of the invention.

The invention claimed is:

1. A system for providing a dough sheet wherein the system facilitates automation of a fermenting process, comprising: a mixer for mixing ingredients to a dough; a plurality of carriers for transporting the dough through the system wherein the carriers are sized to enable automated handling of the carriers; a portioning device for portioning the dough in batches into the carriers; a first fermenting stage, formed by a fermenting cabinet, the fermenting cabinet comprising a conveyor configured for conveying the carriers along a trajectory through the cabinet; a first handler for placing the carriers in a fermenting cabinet wherein the first handler automates the handling of the carriers and avoids the need for manual handling of the carriers; a second fermenting stage, formed by a conveyor of the second fermenting stage; and a second handler, for picking the carriers from the cabinet and placing the dough batches from the carriers onto the conveyor of the second fermenting stage, wherein the second handler is configured for placing the dough batches in a touching or overlapping manner; the system further comprising a switch for bypassing the first and/or second fermenting stage and for delivering green dough, that is un-fermented dough from the mixer, to the dough sheeting stage.

2. The system according to claim 1, comprising a dough sheeting stage, for receiving the dough from the second fermenting stage and forming a sheet from the dough.

3. The system according to claim 2, configured for collecting rework dough generated during further dough processing.

4. The system according to claim 3, further comprising a feedback conveyor, for returning the collected rework dough to the dough process.

5. The system according to claim 4, wherein the feedback conveyor delivers the rework dough to the second fermenting stage.

6. The system The system according to claim 4, wherein the feedback conveyor delivers the rework dough to the dough sheeting stage.

7. The system according to claim 1, wherein the carriers each comprise a bottom with a circumferential wall, dimensioned for carrying between 5 and 25 kg dough.

8. The system according to claim 1, wherein the carriers each comprise a bottom with a circumferential wall, dimensioned for carrying between 10 and 20 kg dough.

9. The system according to claim 1, wherein the carriers each comprise a bottom with a circumferential wall, dimensioned for carrying between 13 and 17 kg dough.

10. The system according to claim 1, wherein the carriers have a height between 10 and 80 cm.

11. The system according to claim 1, wherein the carriers have a height between 20 and 40 cm.

12. The system according to claim 1, wherein the conveyor of the fermenting cabinet is operated in a first-in-first-out mode and configured for containing to contain the carriers for a time period of 1 to 48 hours.

13. The system according to claim 1, wherein the conveyor of the fermenting cabinet is operated in a first-in-first-out mode and configured to contain the carriers for a time period of between 24 and 48 hours.

14. The system according to claim 1 wherein the conveyor of the fermenting cabinet comprises a paternoster cabinet.

15. The system according to claim 14, wherein the paternoster cabinet comprises trays for carrying the carriers.

16. The system according to claim 1 wherein the second fermenting stage is configured to contain the dough for 0-2 hours.

17. The system according to claim 1, further comprising a cutting section, for cutting the thus formed dough sheet into pieces for forming dough products.

18. The system according to claim 1, comprising an oiling station for the carriers, arranged upstream from the portioning device.

19. The system according to claim 1, further comprising a return transporter, wherein the return transporter comprises a cleaning station for the carriers.

20. A system for providing a dough sheet wherein the system facilitates automation of a fermenting process, comprising: a mixer for mixing ingredients to a dough; a plurality of carriers for transporting the dough through the system wherein the carriers are sized to enable automated handling of the carriers; a portioning device for portioning the dough in batches into the carriers; a first fermenting stage, formed by a fermenting cabinet, the fermenting cabinet comprising a conveyor configured for conveying the carriers along a trajectory through the cabinet; a first handler for placing the carriers in a fermenting cabinet wherein the first handler automates the handling of the carriers and avoids the need for manual handling of the carriers; a second fermenting stage, formed by a conveyor of the second fermenting stage; and a second handler, for picking the carriers from the cabinet and placing the dough batches from the carriers onto the conveyor of the second fermenting stage, wherein the second handler is configured for placing the dough batches in a touching or overlapping manner;
the system further comprising a dough sheeting stage, for receiving the dough from the second fermenting stage and forming a sheet from the dough;
the system further configured for collecting rework dough generated during further dough processing;
wherein a feedback conveyor selectively delivers the rework dough to the second fermenting stage or the dough sheeting stage and the system further comprises a switch for selecting whether the feedback conveyor delivers the rework dough to the second fermenting stage or to the dough sheeting stage.

21. A system for providing a dough sheet wherein the system facilitates automation of a fermenting process, comprising: a mixer for mixing ingredients to a dough; a plurality of carriers for transporting the dough through the system wherein the carriers are sized to enable automated handling of the carriers; a portioning device for portioning the dough in batches into the carriers; a first fermenting stage, formed by a fermenting cabinet, the fermenting cabinet comprising a conveyor configured for conveying the carriers along a trajectory through the cabinet; a first handler for placing the carriers in a fermenting cabinet, wherein the first handler automates the handling of the carriers and avoids the need for manual handling of the carriers; a second fermenting stage, formed by a conveyor of the second fermenting stage; a second handler, for picking the carriers from the cabinet and placing the dough batches from the carriers onto the conveyor of the second fermenting stage, wherein the second handler is configured for placing the dough batches in a touching or overlapping manner; a dough sheeting stage, for receiving the dough from the second fermenting stage and forming a sheet from the dough; and a feedback conveyor for selectively delivering rework dough to the second fermenting stage or the dough sheeting stage; the system further comprising a switch for selecting whether the feedback conveyor delivers the rework dough to the second fermenting stage or to the dough sheeting stage.

22. The system according to claim 21 further comprising a cutting section, for cutting the thus formed dough sheet into pieces for forming dough products.

* * * * *